June 7, 1932. E. G. RAGATZ 1,862,063
PROCESS FOR DISTILLING OIL
Filed Dec. 31, 1928
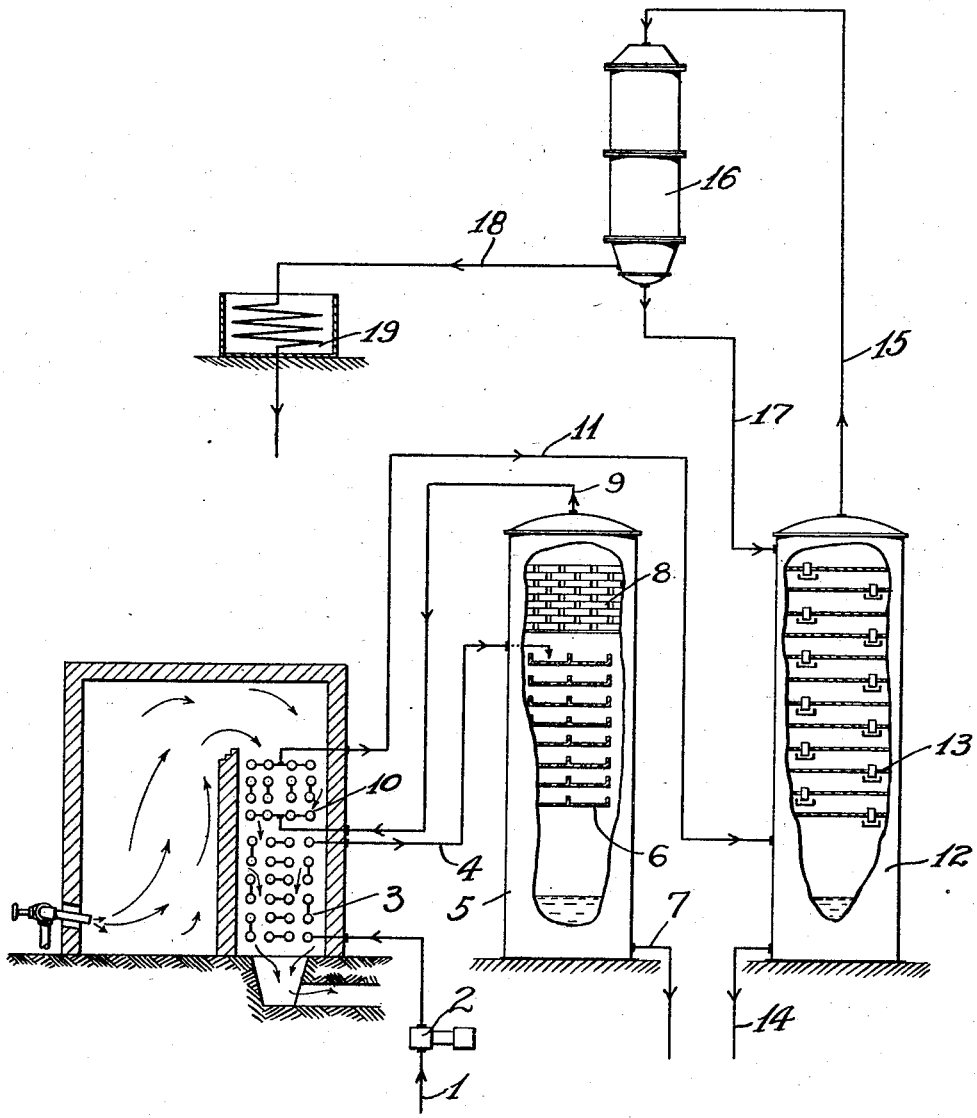
INVENTOR.
Edward G. Ragatz
BY
ATTORNEY.

Patented June 7, 1932

1,862,063

UNITED STATES PATENT OFFICE

EDWARD G. RAGATZ, OF BERKELEY, CALIFORNIA, ASSIGNOR TO UNION OIL COMPANY OF CALIFORNIA, OF LOS ANGELES, CALIFORNIA, A CORPORATION OF CALIFORNIA

PROCESS FOR DISTILLING OIL

Application filed December 31, 1928. Serial No. 329,374.

This invention relates to a method of distillation, especially to the non-cracking distillation of oil.

In the ordinary methods of distillation wherein a liquid, such as oil, is vaporized and the overhead vapors are rectified in the usual rectification column wherein the vapors pass counter current to a stream of condensate formed from the vapors, provision must always be made to re-vaporize the heavy condensate produced in the rectifying column. The overhead vapors, as they pass from the still are saturated at the temperature and pressure employed. Consequently, when the temperature of the vapor drops on entrance into the rectification column and continues to drop as it passes upwardly through the column, the condensate produced from the vapors contains products which it is not desired to have in the rectifier bottoms, but which are desired in the vapors passing from the rectifier. It is, therefore, usual practice to re-vaporize these rectifier tower bottoms by the application of heat such as by steam coils and/or by the introduction of steam into the body of the condensates in the tower.

The method of this invention avoids the necessity of such additional application of heat and avoids the difficulties incident to the introduction of steam into the condensate. Steam when introduced into the rectifier upsets the true equilibrium desired to be had in the rectifier and involves heat losses due to the re-boiling effects caused by the re-vaporization of condensed steam as the steam travels downward.

The invention broadly conceived involves vaporization of a liquid such as oil and the super-heating of vapor above the temperature at which it is evolved and sufficiently so that on introduction into the rectification tower there will be sufficient super-heat to cause the necessary re-boiling of condensates in the tower.

This invention will be better understood by reference to the drawing which shows one form of the invention schematically.

Liquid, such as oil from any source, is passed through line 1 by pump 2 through coils 3, situated in a furnace. The so heated oil is then introduced through line 4 into a vaporizing tower such as 5, where it cascades over trays 6 which may be perforated or provided with any form of liquid and vapor contact devices. The unvaporized residuum is then drawn through line 7 and the vapors pass upwardly through a mist extractor such as tiles 8, which act to remove suspended liquid particles. The resulting vapor is withdrawn through 9 and passed through superheating coils 10, which may be conveniently positioned in the same furnace as coils 3, and in the path of hotter gases. The superheated vapors pass through line 11 into the rectifier 12. The vapors pass through bubble cap plates 13 shown schematically. The rectifier tower bottoms are withdrawn through 14 and over-head vapors pass through 15 to reflux condenser 16, from which the condensate is returned as a reflux to tower 13, via reflux line 17. The uncondensed vapors pass through line 18 to a total condenser 19.

As a specific example of the process oil, such as gasoline containing oil, is heated in coil 3 to a temperature of about 475° F., resulting in a vapor in line 9 at 465° F. This vapor is superheated in 10 to about 575° F. and introduced in tower 13 where it is rectified to produce the desired end point gasoline overhead, and rectifier bottoms of desired characteristics.

It must be particularly pointed out that this process is not directed to vapor phase cracking and the superheating in coil 10 is controlled to avoid cracking. The purpose of the superheat being to provide the necessary heat in the vapors to cause the desired re-boiling in the rectifying column.

The above description is not to be taken as limiting, but merely illustrative of the invention which I desire to claim. Many modifications may be made by the man skilled in the art but will be comprehended within the scope of the invention which I claim to be:

1. A process of distilling oil which comprises vaporizing oil, separately super-heating said oil vapors above the temperature of distillation, but not sufficiently to cause any material cracking thereof, and subsequently rectifying said vapors by introducing